2,756,147

TETRAZAINDENE STABILIZER FOR PHOTOGRAPHIC EMULSIONS SENSITIZED WITH ALKYLENE OXIDE POLYMERS

George A. Reynolds and John Sagal, Jr., Rochester, N. Y., assignors to Eastman Kodak Company, Rochester, N. Y., a corporation of New Jersey No Drawing. Application July 5, 1955,
Serial No. 520,120

16 Claims. (Cl. 95—7)

This invention relates to fog inhibiting agents and stabilizers for photographic emulsions and to photographic emulsions containing them.

It is well known that photographic emulsions on storage tend to lose sensitivity and to become spontaneously developable without exposure to light. There is normally a detectable amount of the silver salt reduced during development in the areas where no exposure was given; this is commonly called "fog," and sometimes called "chemical fog" where it is necessary to distinguish between it and the effects of accidental exposure to radiation; in this invention, we are not concerned with the latter.

Fog depends both on the emulsion and the conditions of development; for a given emulsion it increases with the degree of development. With constant development conditions, it tends to increase with time, temperature and relative humidity of storage conditions; it is common practice to make accelerated tests of the stability of photographic emulsions by storage at increased temperature or humidity, or both. It is, of course, desirable to have emulsions as stable as possible under the conditions of high temperature and humidity which may occur in tropical climates, for example. Fog usually appears over the whole area of the sensitive coating, but when severe, it frequently is non-uniform. Fog may also be caused by exposure to chemicals, for example, hydrogen sulfide and other reactive sulfur compounds, hydrogen peroxide vapor, and strongly reducing materials. While antifoggants and stabilizers may protect, to some extent, against such effects, it is normally understood that an antifoggant protects against spontaneous growth of fog during prolonged storage or storage at high temperatures and humidities, or during development to maximum contrast and speed, or both.

It is known that the effective sensitivity of photographic silver halide emulsions may be increased by adding to them derivatives of alkylene oxides, such as ethylene oxide polymers having molecular weights of 300 or more. The practical value of these compounds is severely limited by their tendency to increase fog on storage of the photographic film, especially storage at elevated temperatures and humidities. It has been found difficult to control this by the antifoggants commonly available without using quantities of antifoggant which partly neutralize the speed increase obtained from the alkylene oxide derivatives.

It is, therefore, an object of the present invention to provide a method for stabilizing photographic emulsions sensitized with alkylene oxide derivatives, such as polyethylene oxides. A further object is to provide a means for reducing the fog produced upon keeping of emulsions so sensitized, especially emulsions stored under tropical or other adverse conditions. A still further object is to provide a means for stabilizing the speed and contrast of emulsions so sensitized. Other objects will appear from the following description of my invention.

These objects are accomplished, in general, by adding to the emulsion sensitized with alkylene oxide polymers, 5-carboxy-4-hydroxy-1,3,3a,7-tetrazaindene as a stabilizing and fog inhibiting agent.

The alkylene oxide polymers used to sensitize the emulsions may be of various types. The alkylene oxides from which the polymers are derived contain from 2 to 4 carbon atoms, e. g., ethylene oxide, propylene oxide and butylene oxide. The preparation of polymers from these compounds is described in Ellis, The Chemistry of Synthetic Resins (1935), pages 990 to 994. These compounds are also referred to as polyalkylene glycols and their use as sensitizers for silver halide emulsions is described in U. S. Patents 2,423,549 and 2,441,389.

Various derivatives of alkylene oxides can also be used to sensitize the silver halide emulsions, e. g., condensation products of alkylene oxide with glycols, such as those having from 8 to 18 carbon atoms, as described in U. S. Patent 2,240,472 and British Patent 443,559, as well as condensation products of alkylene oxides with aliphatic alcohols, aliphatic acids and aliphatic amines, and with phenols, that is, polyalkylene ethers, esters and amine-ethers, the preparation of which is described in U. S. Patent 1,970,573, and condensation products of alkylene oxides with hexitol ring dehydration products, as described in U. S. Patent 2,400,532.

In each case the polyalkylene oxide or derivative of alkylene oxide should have a molecular weight of at least 300 and preferably a molecular weight of 1500 to 4000, or more.

The principal purpose of our invention is to provide a means for maintaining the sensitivity and fog of silver halide emulsions at or close to initial optimum values under conditions of high temperature or humidity or both. Preferably the fog inhibitors which we propose to use are added to the emulsion at any stage during the process of manufacture prior to coating the emulsion. The tetrazaindene fog inhibitor can be added to the emulsion in solution in any convenient solvent not injurious to the emulsion, such as lower alcohols or ketones.

A solution of the tetrazaindene which we employ when added in suitable concentration before coating to unsensitized or optically sensitized silver halide emulsions usually does not appreciably affect the sensitivity and fog when measurements are made soon after coating. However, when sensitometric measurements are made after appreciable intervals of time under tropical or dry conditions of storage at elevated temperatures, this compound does stabilize speed and maintain fog at a low level.

The alkylene oxide derivatives used to sensitize the emulsions can be illustrated by the following specific examples, although our invention is in no way limited to the use of these specific compounds.

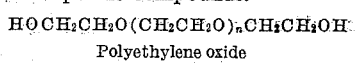

Polyethylene oxide

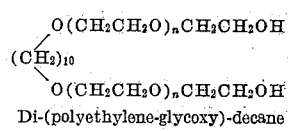

Di-(polyethylene-glycoxy)-decane

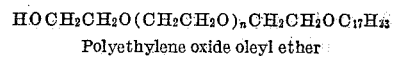

Polyethylene oxide oleyl ether where $n=$an integer greater than about 10.

The preparation of silver halide emulsions involves three separate operations: (1) the emulsification and digestion or ripening of the silver halide, (2) the freeing of the emulsion from aqueous soluble salts usually by washing, (3) the second digestion or after-ripening to obtain increased sensitivity (Mees, The Theory of the Photographic Process, 1942, page 3). The fog inhibiting agent can be added at any stage, preferably after the final digestion.

The photographic emulsions which we use are of the developing-out type and best results have been obtained with gelatino-silver bromoiodide emulsions. However, emulsions of varying halide content can be used.

The emulsions can be chemically sensitized by any of the accepted procedures, in addition to or in combination with the sensitizing with alkylene oxide polymers. The emulsions can be digested with naturally active gelatin, or sulfur compounds can be added, such as those described in Sheppard U. S. Patent 1,574,944 and U. S. 1,623,499, and Sheppard and Brigham U. S. Patent 2,410,689.

The emulsions can also be treated with salts of the noble metals, such as ruthenium, rhodium, palladium, iridium and platinum, all of which belong to group VIII of the periodic table of elements and have an atomic weight greater than 100. Representative compounds are ammonium chloropalladate, potassium chloroplatinate and sodium chloropalladite, which are used for sensitizing in amounts below that which produces any substantial fog inhibition, as described in Smith and Trivelli U. S. Patent 2,448,060, and as antifoggants in higher amounts, as described in Trivelli and Smith U. S. Patents 2,566,245 and 2,566,263.

The emulsions can also be chemically sensitized with gold salts as described in Waller and Dodd U. S. Patent 2,399,083, or stabilized with gold salts as described in Damschroder U. S. Patent 2,597,856 and Yutzy and Leermakers U. S. Patent 2,597,915. Suitable compounds are potassium chloroaurite, potassium aurithiocyanate, potassium chloroaurate, auric trichloride and 2-aurosulfobenzothiazole methochloride.

The emulsions can also be chemically sensitized with reducing agents, such as stannous salts (Carroll U. S. Patent 2,487,850), polyamines such as diethylene triamine (Lowe and Jones U. S. Patent 2,518,698), polyamines such as spermine (Lowe and Allen U. S. Patent 2,521,925), or bis-($\beta$-aminoethyl) sulfide and its water-soluble salts (Lowe and Jones U. S. Patent 2,521,926).

The emulsions can also be stabilized with the mercury compounds of Allen, Byers and Murray U. S. application Serial No. 319,611, now U. S. Patent No. 2,728,663, Carroll and Murray U. S. application Serial No. 319,612, now U. S. Patent No. 2,728,664, and Leubner and Murray U. S. application Serial No. 319,613, now U. S. Patent No. 2,728,665, all filed November 8, 1952.

The sensitizing and stabilizing combinations of polyalkylene oxides and tetrazaindene are effective in the presence or absence of optical sensitizing dyes. Since optical sensitizing may affect stability of emulsions with respect to sensitivity, fog and latent image changes, the action of the compounds of this invention is not completely independent of optical sensitizing or other emulsion variables. We have found, however, that both unsensitized emulsions and emulsions sensitized with cyanine or merocyanine dyes or both can be treated with polyalkylene oxides and tertrazaindene according to our invention.

The most useful concentration of the tetrazaindene compound in the emulsion is from about 0.01 gram to 4 grams per gram mole of silver halide in the emulsion. Although higher amounts can be used, no emulsion is likely to tolerate as much as 5 times this upper limit without serious desensitization. Optimum concentrations are about 0.2 to 1.0 gram of the tetrazaindene per gram mole of silver halide. These amounts can be used in combination with one or more of the chemical sensitizing and stabilizing agents listed above.

The stabilizing action was determined by incubation of the emulsions for one week at 120° F. and constant humidity unless otherwise stated in the examples. The results of aging tests are tabulated below and compare speed, gamma and fog of the emulsions with and without the stabilizing compound.

Example 1

One liter of a high speed gelatino-silver bromiodide emulsion was digested with a sulfur compound, such as disclosed in Sheppard U. S. Patent 1,574,944, and potassium chloroaurate, and panchromatically sensitized with an optical sensitizing dye. To a portion of the emulsion was added 0.9 gram per gram mole of silver halide of 5-carboxy-4-hydroxy-1,3,3a,7-tetrazaindene and to another portion of the same emulsion was added 0.75 gram per gram mole of silver halide of the condensation product of oleyl alcohol with approximately 15 moles of ethylene oxide. To a third portion of the emulsion were added 0.9 gram per gram mole of silver halide of 5-carboxy-4-hydroxy-1,3,3a,7-tetrazaindene and 0.75 gram per gram mole of silver halide of the condensation product of oleyl alcohol with approximately 15 moles of ethylene oxide.

The emulsions were coated on cellulose acetate film base and were exposed for $\frac{1}{25}$ second on an Eastman IB sensitometer and processed for 4 minutes in a developer of the following formula:

| | Grams |
|---|---|
| N-methyl-p-aminophenol sulfate | 2.5 |
| Hydroquinone | 2.5 |
| Sodium sulfite (desiccated) | 30 |
| Sodium metaborate | 10 |
| Potassium bromide | 0.5 |
| Water to 1 liter. | |

A fourth emulsion coating containing 0.75 gram per gram mole of silver halide of the oleyl alcohol-ethylene oxide condensation product and 3.0 grams per gram mole of silver halide of the tetrazaindene was prepared, exposed and processed as before. The films with and without the addenda were held at 120° F. and constant humidity for 1 week and were then exposed and developed as before. The results of tests for speed (10/i), gamma and fog, before and after incubation of each of the samples were as follows:

| Compound | Amount per mole | Fresh | | | Incubation | | |
|---|---|---|---|---|---|---|---|
| | | Speed | Gamma | Fog | Speed | Gamma | Fog |
| Control | none | 4,150 | 1.51 | .16 | 3,450 | 1.22 | .20 |
| 5-carboxy-4-hydroxy-1, 3, 3a, 7-tetrazaindene (I) | 0.9 | 4,750 | 1.48 | .12 | 4,250 | 1.12 | .15 |
| Oleyl Alcohol-Ethylene Oxide Condensation Product (II) | 0.75 | 6,150 | 1.05 | .18 | 5,350 | .89 | .26 |
| I plus II | 0.9 0.75 | 6,900 | 1.13 | .15 | 6,550 | 1.06 | .18 |
| I plus II | 3.0 0.75 | 6,000 | 1.20 | .15 | 6,250 | 1.08 | .14 |

In a manner similar to that illustrated in the above table, other ethylene oxide polymers can be employed to advantage in our invention. For example, in place of the oleyl alcohol-ethylene oxide condensation product employed above, condensation products of ethylene oxide with lauric acid (1 mole of lauric acid to approximately 26 moles of ethylene oxide), phenol (1 mole of phenol to approximately 28.3 moles of ethylene oxide), glycine, lauramide, glucose monolaurate, etc. can be used. Such condensation products can be prepared as described in Carroll U. S. application Serial No. 426,543, filed April 29, 1954, now U. S. Patent 2,743,180, issued April 24, 1956.

The polyethylene oxide polymers used in the emulsions according to our invention can be prepared either by polymerizing ethylene oxide in the presence of aliphatic acids, aliphatic amines or phenols, or by reacting the polymerized polyethylene oxide with aliphatic acids, acid chlorides, or esters, which produces similar products. Instead of incorporation in the silver halide emulsion, the tetrazaindene of our invention can be incorporated in a colloid layer, such as a gelatin layer in contact with the emulsion.

The tetrazaindene which we have described can be used in various kinds of photographic emulsions. In addition to being useful in non-sensitized emulsions, it can also be used in orthochromatic, panchromatic and X-ray emulsions. If used with sensitizing dyes, it can be added to the emulsion before or after the dyes are added. Various silver salts can be used as the sensitive salt, such as silver bromide, silver iodide, silver chloride, or mixed silver halides. The tetrazaindene and alkylene oxide polymers can be used in emulsions intended for color photography, for example, emulsions containing color-forming couplers, or emulsions to be developed by solutions containing couplers.

The dispersing agents can be gelatin or other colloid, such as collodion, albumen, cellulose derivatives or synthetic resins.

The 5-carboxy-4-hydroxy-1,3,3a,7-tetrazaindene used as a fog inhibiting or stabilizing agent in our invention can be prepared as follows:

*Example A.—5-carbethoxy-4-hydroxy-1,3,3a,7-tetrazaindene*

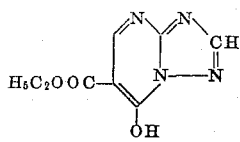

A mixture of 3-amino-1,2,4-triazole (4.2 g.; 0.05 mole) and diethyl ethoxymethylenemalonate (10.8 g.; 0.05 mole) in 35 ml. of glacial acetic acid was refluxed for three hours. After cooling, the solid was collected and recrystallized from either cyclohexanone or aqueous methanol. The yield was 5 g. of product melting at 251° C.

Analysis.—Calcd. for $C_8H_8N_4O_3$: C, 46.2; H, 3.9. Found: C, 46.8; H, 4.2.

*Example B.—5-carboxy-4-hydroxy-1,3,3a,7-tetrazaindene*

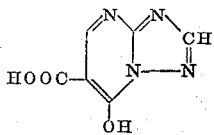

A mixture of 1 g. of 5-carbethoxy-4-hydroxy-1,3,3a,7-tetrazaindene and 10 ml. of 1 N hydrochloric acid were refluxed for five hours. The solid dissolved on heating to reflux, but after about one to two hours a solid began to separate from the solution. After cooling, the solid was collected and recrystallized from water to give 0.5 g. of 5-carboxy-4-hydroxy-1,3,3a,7-tetrazaindene (M. P. 291–292° C.).

Analysis.—Calcd. for $C_6H_4N_4O_3$: C, 40.0; H, 2.2; N, 31.1. Found: C, 39.4; H, 2.4; N, 31.0.

What we claim as our invention and desire secured by Letters Patent of the United States is:

1. A photographic silver halide emulsion sensitized with an alkylene oxide polymer selected from the class consisting of (1) polyalkylene glycols, (2) condensation products of an alkylene oxide with a glycol, (3) condensation products of an alkylene oxide with an aliphatic compound selected from the group consisting of monohydric alcohols, acids and amines, (4) condensation products of an alkylene oxide with a phenol, and (5) condensation products of an alkylene oxide with hexitol ring dehydration products, said alkylene oxide containing from 2 to 4 carbon atoms and said alkylene oxide polymer having a molecular weight of at least 300, said photographic silver halide emulsion containing 5-carboxy-4-hydroxy-1,3,3a,7-tetrazaindene as a fog inhibiting agent.

2. A photographic silver halide emulsion as defined in claim 1 wherein said alkylene oxide polymer is an ethylene oxide polymer.

3. A photographic silver bromiodide emulsion sensitized with an ethylene oxide polymer selected from the group consisting of (1) polyethylene glycols, (2) condensation products of ethylene oxide with glycols, (3) condensation products of ethylene oxide with aliphatic compounds selected from the group consisting of monohydric alcohols, acids and amines, (4) condensation products of ethylene oxide with a phenol, and (5) condensation products of ethylene oxide with hexitol ring dehydration products, said ethylene oxide polymer having a molecular weight of at least 300, said photographic silver bromiodide emulsion containing 5-carboxy-4-hydroxy-1,3,3a,7-tetrazaindene as a fog inhibiting agent.

4. A photographic silver halide emulsion sensitized with an ethylene oxide polymer having a molecular weight of at least 300, and containing 5-carboxy-4-hydroxy-1,3,3a,7-tetrazaindene as a fog inhibiting agent.

5. A photographic silver halide emulsion sensitized with a condensation product of ethylene oxide and an aliphatic monohydric alcohol, said condensation product having a molecular weight of at least 300, and containing 5-carboxy-4-hydroxy-1,3,3a,7-tetrazaindene as a fog inhibiting agent.

6. A photographic sulfur-sensitized silver halide emulsion additionally sensitized with an alkylene oxide polymer selected from the class consisting of (1) polyalkylene glycols, (2) condensation products of an alkylene oxide with a glycol, (3) condensation products of an alkylene oxide with an aliphatic compound selected from the group consisting of monohydric alcohols, acids and amines, (4) condensation products of an alkylene oxide with a phenol, and (5) condensation products of an alkylene oxide with hexitol ring dehydration products, said alkylene oxide containing from 2 to 4 carbon atoms and said alkylene oxide polymer having a molecular weight of at least 300, said photographic silver halide emulsion containing 5-carboxy-4-hydroxy-1,3,3a,7-tetrazaindene as a fog inhibiting agent.

7. A photographic silver halide emulsion as defined in claim 6 wherein said alkylene oxide polymer is an ethylene oxide polymer.

8. A photographic sulfur-sensitized silver bromiodide emulsion additionally sensitized with an ethylene oxide polymer selected from the group consisting of (1) polyethylene glycols, (2) condensation products of ethylene oxide with glycols, (3) condensation products of ethylene oxide with aliphatic compounds selected from the group consisting of monohydric alcohols, acids and amines, (4) condensation products of ethylene oxide with a phenol, and (5) condensation products of ethylene oxide with hexitol ring dehydration products, said ethylene oxide polymer having a molecular weight of at least 300, said photographic silver bromiodide emulsion containing 5-carboxy-4-hydroxy-1,3,3a,7-tetrazaindene as a fog inhibiting agent.

9. A photographic sulfur-sensitized silver halide emulsion additionally sensitized with an ethylene oxide polymer having a molecular weight of at least 300, and containing 5-carboxy-4-hydroxy-1,3,3a,7-tetrazaindene as a fog inhibiting agent.

10. A photographic sulfur-sensitized silver halide emulsion additionally sensitized with a condensation product of ethylene oxide and an aliphatic monohydric alcohol, said condensation product having a molecular weight of at least 300, and containing 5-carboxy-4-hydroxy-1,3,3a,7-tetrazaindene as a fog inhibiting agent.

11. The emulsion of claim 6 which is additionally chemically sensitized with gold salts.

12. The emulsion of claim 9 which is additionally chemically sensitized with gold salts.

13. The emulsion of claim 9 which is additionally stabilized with mercury salts.

14. The emulsion of claim 9 which is additionally chemically sensitized with gold salts and stabilized with a salt of the general formula selected from the group consisting of $R_2MX_6$, $R_2M'X_4$ and $R_3M''X_6$, where R is selected from the group consisting of hydrogen, an alkali metal and ammonium, M is a metal selected from the group consisting of platinum, palladium, iridium, rhodium and ruthenium, M' is a metal selected from the group consisting of platinum and palladium, and M'' is a metal selected from the group consisting of iridium and rhodium, and X is a halogen atom.

15. The emulsion of claim 9 which is additionally chemically sensitized with gold salts and stabilized with a palladium salt having the structure $R_2PdCl_6$ where R is selected from the group consisting of alkali metal and ammonium.

16. The emulsion of claim 9 which is additionally chemically sensitized with gold salts and stabilized with mercury salts.

No references cited.